United States Patent
Lei et al.

(10) Patent No.: US 10,334,020 B2
(45) Date of Patent: Jun. 25, 2019

(54) METHOD AND APPARATUS FOR SENDING TARGET DATA TO AND ACQUIRING TARGET DATA FROM NETWORK

(71) Applicant: PEKING UNIVERSITY SHENZHEN GRADUATE SCHOOL, Shenzhen (CN)

(72) Inventors: Kai Lei, Shenzhen (CN); Jie Yuan, Shenzhen (CN); Yunbo Xun, Shenzhen (CN); Xiang Zhang, Shenzhen (CN); Lirui Gong, Shenzhen (CN)

(73) Assignee: PEKING UNIVERSITY SHENZHEN GRADUATE SCHOOL, Shenzhen, Guangdong (CN)

( * ) Notice: Subject to any disclaimer, the term of this patent is extended or adjusted under 35 U.S.C. 154(b) by 47 days.

(21) Appl. No.: 15/553,949

(22) PCT Filed: Jan. 26, 2016

(86) PCT No.: PCT/CN2016/072132
§ 371 (c)(1),
(2) Date: Aug. 25, 2017

(87) PCT Pub. No.: WO2017/031947
PCT Pub. Date: Mar. 2, 2017

(65) Prior Publication Data
US 2018/0248932 A1    Aug. 30, 2018

(30) Foreign Application Priority Data

Aug. 27, 2015   (CN) .......................... 2015 1 0535047

(51) Int. Cl.
*G06F 13/00*   (2006.01)
*H04L 29/08*   (2006.01)
*H04L 29/06*   (2006.01)

(52) U.S. Cl.
CPC ............ *H04L 67/06* (2013.01); *H04L 67/141* (2013.01); *H04L 69/16* (2013.01)

(58) Field of Classification Search
CPC ....... H04L 29/08; H04L 69/16; H04L 67/141; H04L 67/06
(Continued)

(56) References Cited

U.S. PATENT DOCUMENTS 9,848,056 B2 * 12/2017 Long .................... H04L 67/2852
2012/0011229 A1 * 1/2012 Heller ................. H04L 61/2092
                                                                                709/220
(Continued)

FOREIGN PATENT DOCUMENTS

CN           102984210 A      3/2013

OTHER PUBLICATIONS

Xue, Jin, Zhang, Dong, Tang, Bin. "Research on active detection forwarding strategy for Named Data Networking (NDN)", Computer Engineering and Applications, vol. 50, No. 18, Sep. 30, 2014, ISSN: 1002-833, English Machine-Translation prepared using Bing.Com Microsoft Translate.
(Continued)

*Primary Examiner* — Kenneth R Coulter
(74) *Attorney, Agent, or Firm* — Ladas & Parry, LLP

(57) ABSTRACT

Disclosed are a method and apparatus for acquiring target data from and sending target data to a network. An NDN network and a TCP/IP network are simultaneously contained as a network layer protocol, and the NDN network is used to perform interaction of control information and searching of target data, while the TCP/IP network is used to perform specific transmission of the target data. Not only are intelligent and efficient content distribution advantages of the NDN network made use of, but also, by means of the efficient transmission capability of the TCP/IP network in an
(Continued)

existing network device and communication environment, the content distribution capability in a hybrid network simultaneously having the TCP/IP network and the NDN network is improved.

7 Claims, 4 Drawing Sheets

(58) Field of Classification Search
USPC .................................. 709/245, 217–219, 220
See application file for complete search history.

(56) References Cited

U.S. PATENT DOCUMENTS

| | | | |
|---|---|---|---|
| 2014/0321480 A1* | 10/2014 | Xue | H04L 61/3015 370/475 |
| 2015/0106471 A1* | 4/2015 | Long | H04L 67/2852 709/213 |
| 2018/0007116 A1* | 1/2018 | Trossen | H04L 67/02 |
| 2018/0124053 A1* | 5/2018 | Mullender | H04L 9/12 |
| 2018/0241671 A1* | 8/2018 | Bosch | H04L 45/741 |
| 2018/0316614 A1* | 11/2018 | Liu | H04L 47/12 |

OTHER PUBLICATIONS

International Search Report for PCT/CN2016/072132, dated May 18, 2016, and its English translation provided by WIPO.
Written Opinion of the International Search Authority for PCT/CN2016/072132, dated May 18, 2016, and its English translation provided by Bing.Com Microsoft Translate.

\* cited by examiner

METHOD AND APPARATUS FOR SENDING TARGET DATA TO AND ACQUIRING TARGET DATA FROM NETWORK

CROSS REFERENCE TO RELATED APPLICATIONS

The present application is the U.S. national phase of PCT Application No. PCT/CN2016/072132 filed on Jan. 26, 2016, which claims priority to Chinese Patent Application No. 201510535047.2 filed on Aug. 27, 2015, the disclosures of which are incorporated herein by reference in their entireties.

TECHNICAL FIELD

The present invention relates to network communication technical field, more particularly refers to a method and apparatus for sending and acquiring target data from network.

BACKGROUND

NDN (Named Data Networking) is a content-centric future Internet architecture that attempts to gradually replace the TCP/IP network architecture that dominates the Internet for half a century. NDN network has advantages such as intelligent forwarding, decentralization, and location-independent, therefore the applications in NDN network have a more simple structure compared to that in TCP/IP network. It is because in the NDN network the data retrieval is in the network layer instead of the application layer. When a user of a content distribution application wants a specific data, the application only needs to get the name of the data in advance, and then sends the name to the network, and NDN network will automatically find the data corresponding to the name and return the data. In addition, the NDN network has a stronger and more natural scalability. This is also because the NDN network layer bears more functions, while eliminating the need for resource locating logic, and the need for a specified node responsible for global data scheduling, which is spontaneously solved by the network routing layer.

However, due to the limitations of hardware devices, the current NDN network can only be implemented based on Overlay Technology in the existing TCP/IP network, and the NDN network router function is simulated by CCNx, NFD and other software. So the advantages of NDN compared to TCP/IP networks are greatly limited and weakened. In this case, compared to the NDN network, TCP/IP network also has some special advantages during the network transition period. Firstly, IP is a connection-based communication protocol whose network layer control information consumes less network bandwidth, so it is more preferable for data transmission when communication destination address is specified. Secondly, because the implement of the current NDN network based on TCP/IP network by Overlay Technology leads to NDN packet signature delay, more transmission path in NDN routing algorithm and other undesirable factors, as a result the transmission efficiency of NDN network is lower than that of the TCP/IP network. In other words, in the NDN network implemented based on TCP/IP Overlay Technology, the transmission efficiency of packet is lower than that of the TCP/IP network.

SUMMARY

One object of the present invention is to provide a method and apparatus capable of efficiently improving the content distribution capability in a hybrid network in which a TCP/IP and a NDN network exist simultaneously, transmitting target data to a network and retrieving target data from a network.

The present invention provides a method for acquiring target data from a network, comprising: sending a NDN request packet to a NDN network, wherein the NDN request packet containing identification information of the target data; receiving an NDN packet returned from the NDN network, wherein the NDN packet containing an IP address of a terminal comprising the target data; extracting the IP address from the NDN packet; establishing a TCP/IP communication connection with the terminal over the TCP/IP network according to the IP address; and acquiring the target data from the terminal via the TCP/IP communication connection.

In some embodiments of the present invention, the method further comprising: storing the target data and the identification data of the target data after acquiring the target data from the terminal.

In some embodiments of the present invention, the method further comprising: after acquiring the target data from the terminal, converting the target data into a format of the NDN network packet and storing the target data converted into the format of the NDN network packet and the identification information of the target data.

In some embodiments of the present invention, there is also provided a method for transmitting target data to a network, comprising: receiving an NDN request packet from a remote terminal from a NDN network; extracting identification information of a target data from the NDN request packet; searching for the target data in accordance with the identification information in the local memory; converting the local IP address into a first NDN packet conforming to the NDN network packet format when the target data is present in the memory; sending the first NDN packet through the NDN network to the remote terminal; receiving a communication connection request from a TCP/IP network and establishing a TCP/IP communication connection; transmitting the target data via the TCP/IP communication connection.

In some embodiments of the present invention, the method further comprising: when the target data is not present in the memory, forwarding the NDN request packet to the NDN network; receiving a second NDN packet returned from the NDN network, wherein the second NDN packet containing an IP address of a terminal comprising the target data; and transmitting the second NDN packet to the remote terminal through the NDN network.

The present disclosure also provides an apparatus for acquiring target data from a network, comprising: a NDN network interface; a TCP/IP network interface; a NDN control unit for implementing communication according to the NDN protocol; a TCP/IP control unit for implementing communication according to the TCP/IP protocol; a controller for controlling the NDN control unit and the TCP/IP control unit; wherein, the NDN control unit sends the NDN request packet to the NDN network through the NDN network interface under the control of the controller, wherein the NDN request packet contains identification information of the target data; wherein the NDN control unit receives the NDN packet containing the IP address of the terminal comprising the target data from the NDN network via the NDN network interface and extracts the IP address from the NDN packet; wherein the TCP/IP control unit establishes a TCP/IP communication connection with the terminal over the TCP/IP network via the TCP/IP network interface according to the IP address and acquires the target data from the terminal through the TCP/IP communication connection.

In some embodiments of the present invention, the apparatus further comprising a memory for storing the target data and identification information of the target data.

In some embodiments of the present invention, wherein the controller is further configured to control the NDN control unit to convert the target data into the format of a NDN network packet and store the converted target data and the identification information of the target data in the memory.

The present disclosure also provides an apparatus for transmitting target data to a network, comprising: a NDN network interface; a TCP/IP network interface; a NDN control unit for implementing communication according to the NDN protocol; a TCP/IP control unit for implementing communication according to the TCP/IP protocol; a controller for controlling the NDN control unit and the TCP/IP control unit; wherein the NDN control unit receives under the control of the controller the NDN request packet from the remote terminal via the NDN network through the NDN network interface and extracts the identification information of the target data from the NDN request packet; wherein the NDN control unit is configured to search the target data in the local memory based on the identification information and convert the local IP address into a first NDN packet conforming to a NDN network packet format when the target data is present in the memory and transmit the first NDN packet to said remote terminal via said NDN network via said NDN network interface; wherein TCP/IP control unit is configured to receive a communication connection request from a TCP/IP network through the TCP/IP network interface and establishing a TCP/IP communication connection, and transmit the target data via the TCP/IP communication connection.

In some embodiments of the present invention, the NDN control unit is further configured to forward the NDN request packet to the NDN network through the NDN network interface when the target data is not present in the memory, and receive a second NDN packet returned by the NDN network, wherein the second NDN packet containing an IP address of a terminal comprising the target data, and transmit the second NDN packet through the NDN network to the remote terminal.

In the method and the device provided in the present disclosure, the NDN network and the TCP/IP network are simultaneously included as network layer protocol, while the NDN network is used to control the interaction of the information and the retrieval of the target data, and the TCP/IP network is used to carry out the specific the transmission of target data, which not only exerts the advantages of NDN network intelligence and efficiency in content distribution, but also improves the efficient transmission capability of IP network under the existing network equipment and communication environment, and effectively improves the existence of TCP/IP and NDN network Of the content distribution capabilities of the hybrid network.

DETAILED DESCRIPTION

Specific steps of a method for transmitting and receiving target data with a network and a specific structure of a related apparatus will be described hereinafter in detail according to an embodiment of the present invention with reference to the accompanying drawings.

Figure 1:
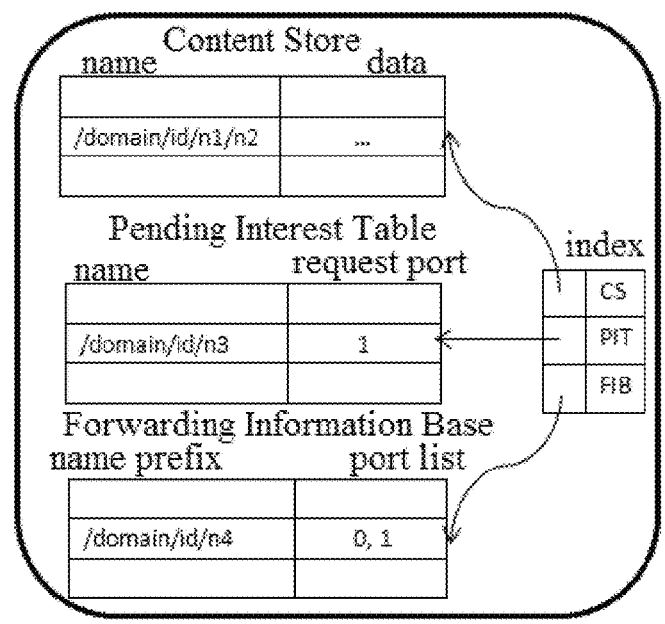
FIG. 1 illustrates a schematic diagram of three data structures and the relationship therebetween in the NDN.

There are two types of transport packets in the NDN: Interest package (request packet) and Data package (packet). The main function of the request packet is to request data, i.e. the corresponding packet. As shown in FIG. 1, the router in the NDN network contains three main data structures: FIB (Forwarding Information Base), PIT (Pending Interest Table), and CS (Content Store). The consumer of the data (the receiving end) requests the required data (referred to herein as the "target data") by sending a request packet with a specific name to the network, and the router in the network forwards the request packet based on the information in the FIB; any network node that receives the request packet can reply with a packet if it has the data that can satisfy the request packet so as to send the data content to the receiving end. The packet is transmitted only as a response to the request packet, and it is not necessary to route the packet itself. It returns along the route opposite the path by which the packet is transmitted. All intermediate routers that the packet passed through will cache the forwarded packet in their own CS.

Figure 2:
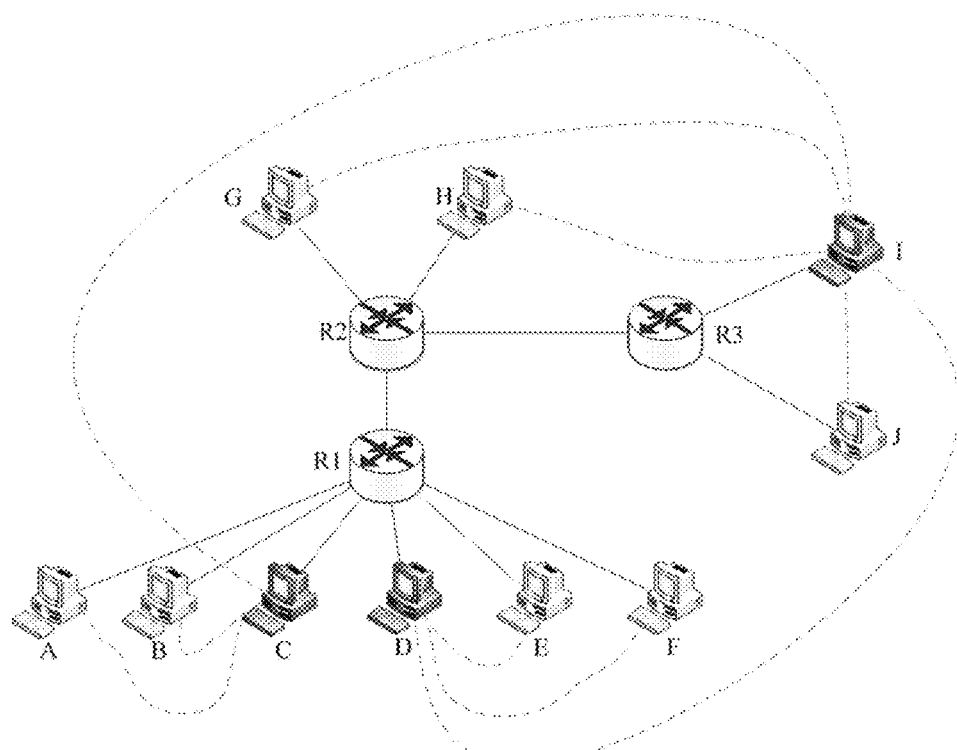
FIG. 2 presents a schematic diagram illustrating a physical topology of a NDN network based on TCP/IP Overlay deploying CCNx.
Figure 3:
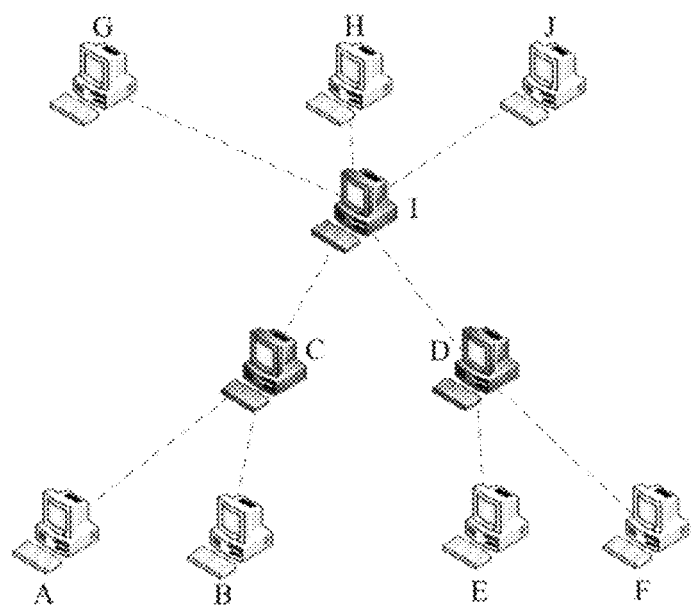
FIG. 3 presents a schematic diagram illustrating the logical topology of the NDN network based on TCP/IP Overlay deploying CCNx corresponding to FIG. 2.

Assume that a topology of a NDN network based on TCP/IP Overlay deploying CCNx program is shown in FIG. 2, where nodes C, D and I are routers in the NDN network, and R1, R2 and R3 are routers in the TCP/IP network, and A, B, E, F, G, H, J are terminals. In the figure, the solid line indicates the connection of each node in the TCP/IP network. The dotted line indicates the connection of each node under the NDN network. When only consider the NDN network node and ignore the underlying TCP/IP network, a logic topology of NDN network can be obtained as shown in FIG. 3.

Assuming that a packet is transmitted from node A to node G, according to the topology shown in FIG. 2, the packet will eventually be transmitted over the TCP/IP network by the route as follows: A→R1→R2→G; While in the NDN network based on TCP/IP Overlay technology, the transmission path of the packet from node A to node G is shown as follows: A→R1→C→R1→R2→R3→I→R3→R2→G. It can be seen that in the NDN network based on TCP/IP Overlay technology, the transmission efficiency of data packets is inefficient compared with that in TCP/IP network.

In the embodiment of the present invention, there is proposed a method and an apparatus for transmitting data to a network and acquiring data from a network in a NDN network based on a TCP/IP Overlay technology, which uses an NDN network to control the interaction of information and the retrieval of data and use the TCP/IP network for the transmission of specific data, so as to not only play the advantages of network intelligence and efficient content distribution in NDN network, but also take the advantage of the efficient transmission of IP networks with the existing network equipment and communication environment, which will be described in detail with reference to the accompanying drawings.

4 is a block diagram showing a block diagram of an apparatus for acquiring target data from a network and/or transmitting target data to a network according to an embodiment of the present invention.

Figure 4:
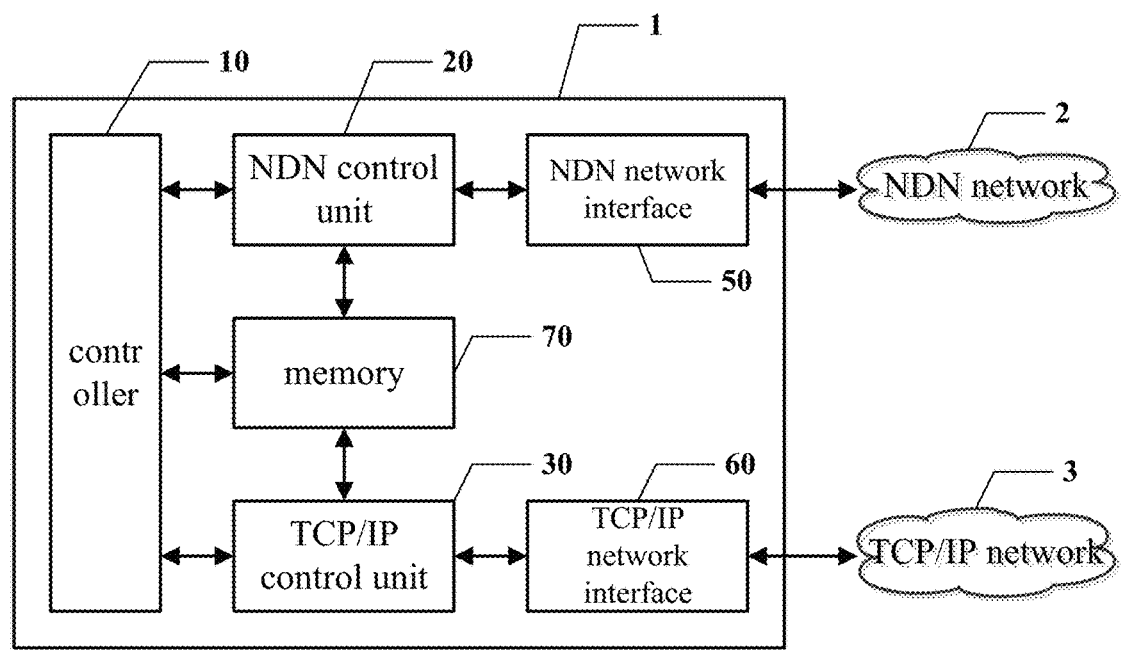
FIG. 4 presents a block diagram illustrating an apparatus for acquiring target data from a network and/or transmitting target data to a network according to some embodiments of the present invention.

As shown in FIG. 4, in some embodiments of the present invention, the apparatus 1 for obtaining the target data from the network and/or transmitting the target data to the network may include a controller 10, a NDN control unit 20, a TCP/IP control unit 30, a NDN network interface 50, a TCP/IP network interface 60, and a memory 70.

The NDN network interface 50 can be connected to the NDN network 2, in other words, the apparatus 1 can be connected to the NDN network 2. The TCP/IP network interface 60 can be connected to the TCP/IP network 3, in other words, the apparatus 1 can be connected to the TCP/IP network 3.

The NDN control unit 20 can realize communication according to the NDN protocol. When the NDN network interface 50 is connected to the NDN network 2, the apparatus 1 can function as a node or terminal of the NDN network 2 with the NDN control unit 20, and carry out data communication compliant with the NDN protocol through the NDN network 2 with the other nodes or terminals on the NDN network.

Similarly, the TCP/IP control unit 30 can implement communication according to the TCP/IP protocol. When the TCP/IP network interface 60 is connected to the TCP/IP network 3, the apparatus 1 can function as a node or terminal of the TCP/IP network 3 with the TCP/IP control unit 30, and the TCP/IP network 3 implements data communication compliant with TCP/IP protocol through TCP/IP network with other nodes or terminals on the TCP/IP network.

The controller 10 controls the operation of the apparatus 1, for example, to control the operation of the NDN control unit 20 and the TCP/IP control unit 30. In some embodiments, the controller 10 may also control the operation of other devices, elements, circuits, and/or devices contained in the apparatus 1.

In the embodiments of the present invention, the controller 10, the NDN control unit 20, the TCP/IP control unit 30, the NDN network interface 50, the TCP/IP network interface 60, and the memory 70, which will be described later and hereinafter, may be separate elements or circuits; or, some of these elements, or portions of one or more of these elements may be combined in one or more elements or circuits, and the invention is not limited thereto. For example, in some embodiments, all or a portion of one or more of these elements may be implemented by a microprocessor, an application specific integrated circuit, a programmable logic device, such as an FPGA, and the like.

In the embodiment of the present invention, the apparatus 1 may request and acquire the target data as a data requestor on the network, or may provide the target data to other terminals on the network as data provider, or may be used only as intermediate transit node between the other data requesters and data providers on the network, as will be described below respectively.

Embodiment 1: Apparatus 1 Function as Data Requestor

Figure 5:
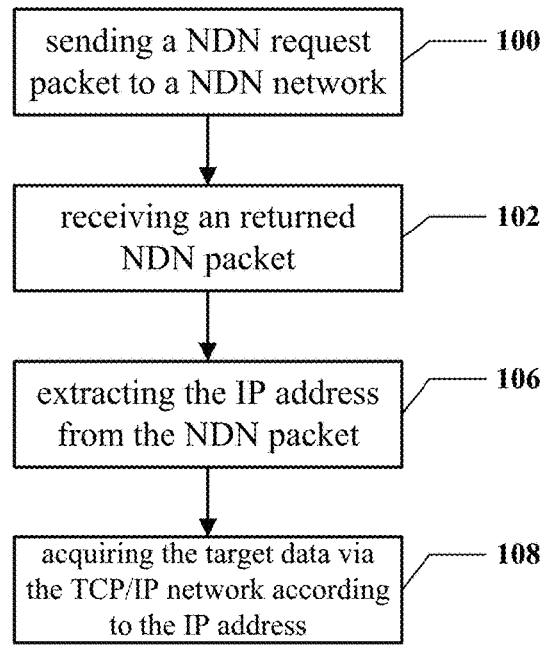
FIG. 5 presents a flow diagram illustrating a method for acquiring target data from a network at the apparatus in FIG. 4 as a data requester in some embodiments of the present invention.

FIG. 5 presents a flow diagram illustrating a method for acquiring target data from a network at the apparatus 1 as a data requester in some embodiments of the present invention As shown in FIG. 1, in the present embodiment, when the apparatus 1 itself (for example, the apparatus 1 itself contains other service logic modules not shown in FIG. 1, and the service logic module needs to acquire the target data from the network; or the unit of the apparatus 1 needs to acquire the target data from the network, etc.) or the other electronic devices connected to the apparatus 1 need to obtain the target data through the network. In step 100, the controller 10 may control the NDN control unit 20 to construct the request packet compliant with the NDN protocol and sends the constructed NDN request packet to the NDN network 2 through the NDN network interface 50.

Here, the NDN request packet may contain identification information of the desired target data. In an embodiment of the present invention, the identification information herein may be any suitable information capable of identifying the desired target data. For example, in some embodiments, the identification information may be the name of the desired target data, and so on. In some embodiments, the identification information may be included or embodied in the name field in the request packet.

NDN request packet is sent to the NDN network 2, the other terminal or node on the NDN network 2 may respond to the NDN request packet as described above and return the packet (the response procedure will be provided in the embodiment of the present invention in which the apparatus 1 functions as a data provider).

As described below, in the embodiment of the present invention, the control information (e.g., the data source of the target data or the IP address of the terminal, etc.), rather than the target data itself, is transmitted with the NDN network. Thus, the NDN packet returned by the other terminal or node on the NDN network 2 in response to the NDN request packet may contains control information (e.g., IP address, etc.) of the terminal or node, without the target data itself. In order to enable the responding terminal or node to respond the current NDN request packet and identify that the packet may contain only control information (e.g., IP address, etc.) instead of the target data itself, it is feasible to set a corresponding first work mode ID in the NDN request packet when constructing the NDN request packet. The first work mode ID can indicate whether the NDN request packet requires returning the target data directly as a NDN packet or the IP address of the terminal comprising the target data as a NDN packet. Similarly, the NDN packet returned by the responding terminal or node may also contain a corresponding second work mode ID which may indicate whether the NDN packet is a NDN packet containing the target data or the NDN packet containing the IP address of the terminal comprising the target data. In this way, the terminal receiving the NDN request packet or the NDN packet knows how to respond to the received NDN request packet or how to proceed after receiving a NDN packet according to the first operating mode ID or the second work mode ID.

In some embodiments of the present invention, the first work mode ID and the second work mode ID may be defined the same, or may be defined differently.

For example, in some embodiments, a flag may be set in the NDN request packet or a specific field may be added to the NDN request packet (e.g., adding a specific field as a prefix or suffix for the name field in the NDN request packet, or the specific field, or it is also possible to add to any other suitable location in the NDN request packet that may be any suitable field that can indicate the current operating mode, for example, /IP-NDN-hybrid-network/, etc.). For example, when the flag bit is 1 or the NDN request packet contains a specific field, the responding terminal or node returns control information (e.g., IP address, etc.) as NDN packets, that is, according to the present invention; and when the flag bit is 0 or the NDN request packet does not contain the specific field, the responding terminal or node operates in a conventional mode in the NDN network (e.g. returning the target data as NDN packet directly).

In some embodiments, the responding terminal or node may set a flag in the NDN packet or add a specific field to the NDN packet as well, when responds to the NDN request packet (e.g., /IP-NDN-Hybrid-network/, etc.). For example, when the flag bit is 1 or the NDN contains a specific field, it indicates that the NDN packet contains the IP address of the terminal with the target data. When the flag bit is 0 or the specific packet is not included in the request packet, it indicates that the NDN packet contains the target data.

Alternatively, in some embodiments, it is possible to configure all terminals or nodes on the network to operate only in the manner provided in the embodiments of the present invention, i.e., the terminals or nodes on the network return NDN packets which only contain the control information (for example, the IP address of the terminal comprising the target data) by default, without the target data itself.

When the NDN network 2 returns the NDN packet, the NDN control unit 20 may receive the NDN packet returned from the NDN network 2 through the NDN network interface 50 in step 102. The NDN packet will contain the IP address of the terminal on the NDN network 2 that owns the target data. Then, in step 106, the NDN control unit 20 may extract the IP address from the NDN packet.

After obtaining the IP address, in step 108, the controller 10 may send the IP address to the TCP/IP control unit 30. The TCP/IP control unit 30 establishes a direct TCP/IP communication connection with the terminal corresponding to the IP address via the TCP/IP network interface 60 over the TCP/IP network 3 according to the IP address. The method of establishing a TCP/IP communication connection between two terminals may use a method of establishing a TCP/IP communication connection commonly used in the art, which will not be described herein in detail.

After establishing a TCP/IP communication connection, the TCP/IP control unit 30 can issue a request for request object data to the terminal through the TCP/IP communication connection (i.e., via the TCP/IP network 3); the terminal can transmit the target data to the apparatus 1 after receives the request for the target data by sending the target data through the TCP/IP communication connection (the detailed procedure would be described hereinafter in the embodiment in which the apparatus 1 functions as an data provider). Thus, the apparatus 1 acquires the desired target data from the terminal.

Figure 6:
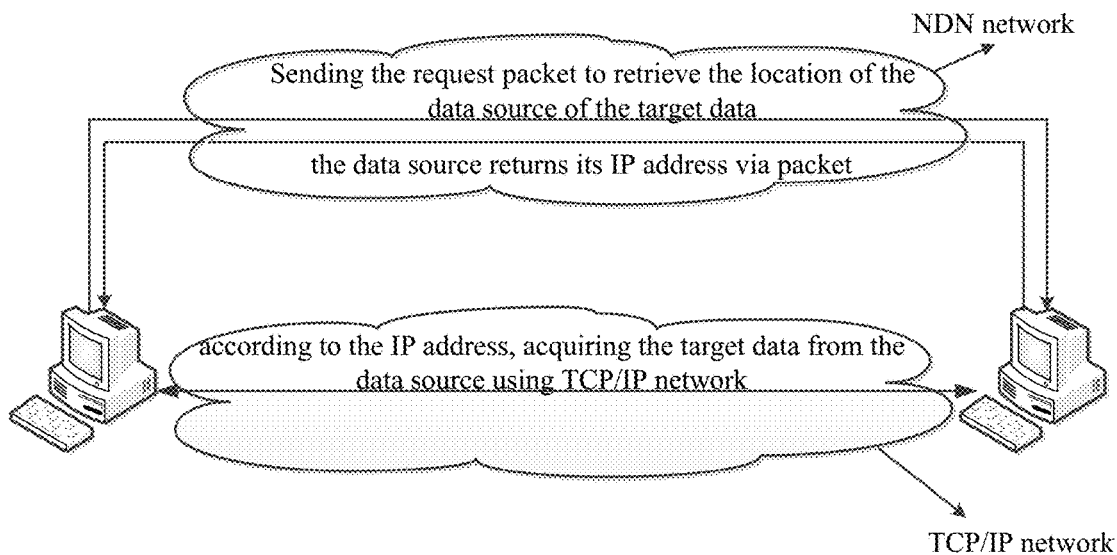
FIG. 6 presents a schematic diagram illustrating an interaction process between the apparatus in FIG. 4 and other terminals on the network in according with some embodiments of the present invention.

In the present embodiment, the schematic diagram of the interaction between the apparatus 1 and other terminals on the network is shown in FIG. 6. It can be seen that in this embodiment, the NDN network is used to carry out the interaction of the request packet (which contains the control information) and the retrieval of the target data, and the TCP/IP network is used for the transmission of the specific data, which not only plays the advantages of intelligent network and efficient content distribution of the NDN network, but also high the transmission capacity of the existing network equipment and communication environment, thus the present invention effectively improves the content distribution capability in the TCP/IP and NDN hybrid network.

In some embodiments, after the target data is retrieved from the terminal corresponding to the IP address, the target data and the identification information of the target data may be stored in a local memory (e.g., the memory 70 or the NDN control unit 20 of the apparatus 1 in the NDN data structure of the CS, etc.) for the subsequent retrieval or access by other terminals on the network. For example, in some embodiments, after receiving the target data, the target data may be stored in the memory 70 and the identification information of the target data (e.g., the name field in the request packet) may be updated in the CS in the NDN control unit 20.

In some embodiments, after obtaining the target data from the terminal corresponding to the IP address, the NDN control unit 20 may convert the target data into a format of the NDN network packet and store the converted target data and identification information of the target data (e.g., the name field in the request packet) in a local memory (e.g., memory 70 or CS of the NDN data structure in the NDN control unit 20 of the apparatus 1, etc.) for the subsequent retrieval or access of other terminals on the network directly and solely through the NDN network.

Embodiment 2: The Apparatus 1 Serves as a Data Provider

Figure 7:
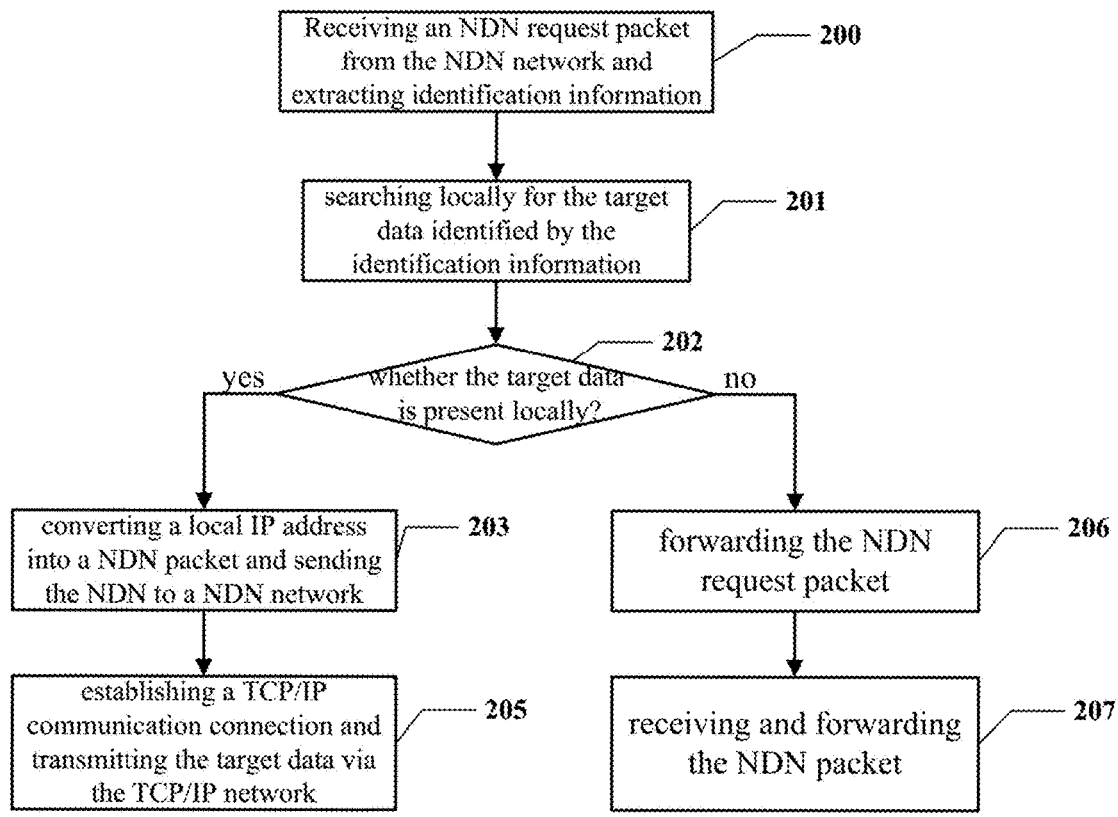
FIG. 7 presents a flow diagram illustrating a method for transmitting target data to network at the apparatus in FIG. 4 as a data provider according to some embodiments of the present invention.

FIG. 7 is a flow diagram of a method for transmitting the target data to the network when the apparatus serves as a data provider according to some embodiments.

As shown in FIG. 7, at step 200, when the apparatus 1 serves as a terminal on the NDN network receiving NDN request packet from remote terminal (e.g., a previous node or terminal in the NDN network), the NDN control unit 20 receives through the NDN network interface 50 the NDN request packet from the remote terminal over the NDN network 2. As described above, the NDN request packet contains identification information of the target data required by the data requestor. Therefore, in this step, the NDN control unit 20 may extract the identification information of the target data from the NDN request packet.

Then, in step 201, the NDN control unit 20 may search in a local (e.g., apparatus 1 or device containing apparatus 1) memory (e.g., memory 70 or other storage device or storage unit, such as CS in the aforementioned NDN data structure) for the target data based on the identification information. For example, in some embodiments, the NDN control unit 20 may extract the name field in the received NDN request packet and search for a record matching the name field in the CS in the NDN data structure of the NDN control unit 20 based on the content of the name field. If there is a record matching the name field and the target data indicated by the identification information is present locally, the target data can be obtained based on the matching record; otherwise, the target data is not present locally.

In step 202, the controller 10 may determine whether or not the target data indicated by the identification information is present in the local memory.

When the target data indicated by the identification information is present in the local memory, in step 203, the NDN control unit may convert the local IP address into a first NDN packet conforming to the NDN network packet format and send the converted first NDN packet to the remote terminal via the NDN network interface 50 through the NDN network 2, and the remote terminal is the one directly sent the NDN require to the apparatus 1. In a preferred embodiment, apparatus 1 returns the first NDN packet to the remote terminal by the original route of the request packet.

The remote terminal may be the original data requestor, that is, the terminal that needs the target data; it may also be the intermediate node, that is, the remote terminal simply forwards the NDN request packet as an intermediate node. When the remote terminal is an intermediate node, it forwards the received first NDN packet, and so on until the first NDN packet is forwarded to the original data requester.

After the original data requester receives the first NDN packet, similarly to the embodiment 1 described earlier, the original data requester will extract the IP address contained therein (i.e., the local IP of the apparatus 1) from the first NDN packet, and then establish a communication connection directly with the apparatus 1 over the TCP/IP network.

Then, in step 205, the TCP/IP control unit 30 may receive the communication connection request from the original data requestor from the TCP/IP network 3 through the TCP/IP network interface 60 and establish a direct connection with the original data requestor via the TCP/IP communication connection. After establishing the TCP/IP communication connection, the original data requester will send a request to request the target data through the TCP/IP communication connection (as described in Example 1). After receiving the request for the request object data sent by the original data requestor, the TCP/IP control unit 30 may send the target data indicated by the identification information through the TCP/IP communication connection (i.e., via the TCP/IP network 3) to the original data requestor.

The method of data exchange between the apparatus 1 and the original data requester via the established TCP/IP communication connection may use methods commonly used in the art and will not be further elaborated herein.

And when there is no target data indicated by the identification information in the local memory, in step 206, the NDN control unit 20 may forward the NDN request packet to the NDN network through the NDN network interface 50, for example, to the next terminal in the NDN network.

If the target data indicated by the identification information exists in the next terminal, the terminal will return the NDN packet containing its IP address; if the target data indicated by the identification information is not present in the next terminal, it will continue to forward the NDN Requests the packet until it reaches the terminal in the NDN network 2 that owns the target data indicated by the identification information or the NDN request packet is discarded due to a timeout. When there is a terminal in the NDN network 2 comprising the target data indicated by the identification information and the NDN request packet arrives at the terminal, the terminal will respond with the original return of the NDN packet containing its IP address. These returned NDN packets arrive at apparatus 1. In this context, the NDN packet returned by the apparatus 1 to the NDN network 2 after the apparatus 1 forwards the NDN request packet is referred to as the second NDN packet. It is easy to understand that the second NDN packet contains an IP address of a terminal comprising the target data indicated by the aforementioned identification information.

At this time, in step 207, the NDN control unit 20 may receive the second NDN packet returned from the NDN network 2 through the NDN network interface 50 and transmit the second NDN packet through the NDN network 2 to the aforementioned remote Terminal (i.e., the terminal that sends the NDN request packet received by the apparatus 1).

In the method and apparatus provided in the embodiment of the present invention, the NDN network and the TCP/IP network are included as the network layer protocol, and the NDN request packet is exchanged and the target data is retrieved using the NDN network, and the TCP/IP network is used to carry out the transmission of specific target data. The request packet contains control information (such as IP address) and does not contain the specific target data, so the volume of data transmission is very small. And it is transmitted majorly by a lot of router or node in NDN network which means the present invention could not only play the advantages of network intelligence and efficient distribution of content in NDN network so as to facilitate the intelligent and fast retrieval of the data source or terminal with the target data in the network, but also avoid significant decline of transmission efficiency because the volume of data transmission is small; and target data which usually has a relatively large volume is transmitted through relatively less router in TCP/IP network, so as to significantly improve the transmission efficiency. Thus, the method and apparatus of the embodiment of the present invention not only exert the advantages of NDN network intelligence and efficient content distribution, but also the efficient transmission capability of TCP/IP network based on the existing network equipment and communication environment, and improve the content distribution capability and efficiency in a hybrid network where TCP/IP and NDN networks exist simultaneously.

The methods provided in the embodiments of the present invention may be implemented using software, hardware, firmware, or a combination thereof, and the present invention is not limited thereto.

It will be understood by those skilled in the art that all or part of the various methods of the embodiments described above may be programmed to instruct the associated hardware to be completed, which may be stored in a computer-readable storage medium, which may include read-only memory, Random access memory, disk or optical disk.

While the present invention has been described above by way of specific examples, the present invention is not limited to these specific embodiments. It will be understood by those skilled in the art that various modifications, equivalent substitutions, variations, and the like may be made to the present invention without departing from the spirit of the invention and should be within the scope of the present invention. In addition, the above-described "one embodiment" described above refers to a different embodiment, and of course, all or part thereof may be combined in one embodiment.

The invention claimed is:

1. A method of acquiring target data from a network, comprising:

sending an NDN request packet to an NDN network, wherein the NDN request packet comprises identification information of the target data and a first work mode ID, wherein the first work mode ID is configured to indicate that the NDN request packet will return the target data directly as an NDN packet or the NDN request packet will return an IP address of a terminal comprising the target data as the NDN packet;

receiving an NDN packet returned from the NDN network, wherein the NDN packet comprises an IP address of a terminal comprising the target data and a second work mode ID, wherein the second work mode ID indicates the NDN packet is an NDN packet comprising the target data or the IP address of the terminal comprising the target data;

identifying the second work mode ID and performing the following steps when the second work mode ID indicates that the NDN packet comprises the IP address of a terminal comprising the target data:

extracting the IP address from the NDN packet;

establishing a TCP/IP communication connection with the terminal through the TCP/IP network according to the IP address; and acquiring the target data from the terminal via the TCP/IP communication connection.

2. The method according to claim 1, further comprising: storing the target data and the identification information of the target data after acquiring the target data from the terminal.

3. The method according to claim 1, further comprising: after acquiring the target data from the terminal, converting the target data into a format of the NDN network packet and storing the target data converted into the format of the NDN network packet and the identification information of the target data.

4. An apparatus for acquiring target data from a network, comprising:

an NDN network interface;

a TCP/IP network interface;

an NDN control unit for implementing communication according to an NDN protocol;

a TCP/IP control unit for implementing communication according to a TCP/IP protocol;

a controller for controlling the NDN control unit and the TCP/IP control unit;

wherein, under the control of the controller:

the NDN control unit sends an NDN request packet to an NDN network through the NDN network interface, wherein the NDN request packet comprises identification information of the target data and a first work mode ID indicating that the NDN request packet will return the target data directly as an NDN packet or the NDN request packet will return an IP address of a terminal comprising the target data as the NDN packet;

the NDN control unit receives the NDN packet from the NDN network via the NDN network interface, wherein the NDN packet comprises the IP address of the terminal comprising the target data and a second work mode ID, wherein the second work mode ID indicates the NDN packet is an NDN packet comprising the target data or the IP address of a terminal comprising the target data, and the NDN control unit is further configured to identify the second work mode ID and extracts the IP address from the NDN packet when the second work mode ID indicates that the NDN packet comprises the IP address of a terminal comprising the target data; and the TCP/IP control unit establishes a TCP/IP communication connection with the terminal over the TCP/IP network via the TCP/IP network interface according to the IP address and acquires the target data from the terminal through the TCP/IP communication connection.

5. The apparatus according to claim 4, further comprising a memory for storing the target data and identification information of the target data.

6. The apparatus according to claim 5, wherein the controller is further configured to control the NDN control unit to convert the target data into the format of a NDN network packet and store the converted target data and the identification information of the target data in the memory.

7. A non-transitory computer-readable medium storing a computer-executable program, wherein the executable program is executed by a computer such that:

sending an NDN request packet to an NDN network, wherein the NDN request packet comprises a identification information of a target data and a first work mode ID indicating that the NDN request packet will return the target data directly as an NDN packet or the NDN request packet will return the IP address of the terminal comprising the target data as the NDN packet;

receiving the NDN packet returned from the NDN network, wherein the NDN packet containing an IP address of a terminal comprising the target data and a second work mode ID indicating that the NDN packet contains target data or the IP address of a terminal comprising the target data;

identifying the second work mode ID and performing the following steps when the second work mode ID indicates that the NDN packet comprises the IP address of a terminal comprising the target data:

extracting the IP address from the NDN packet;

establishing a TCP/IP communication connection with the terminal over a TCP/IP network according to the IP address; and acquiring the target data from the terminal via the TCP/IP communication connection.

* * * * *